(12) United States Patent
Yang et al.

(10) Patent No.: US 7,981,831 B2
(45) Date of Patent: Jul. 19, 2011

(54) CATALYSTS, METHODS OF MAKING CATALYSTS, AND METHODS OF COMBUSTION

(75) Inventors: Barry Lee-Mean Yang, Dublin, OH (US); Ruiqiang Long, Columbus, OH (US); Junko M. Watson, Dublin, OH (US); Abhishek Gupta, Dublin, OH (US)

(73) Assignee: Velocys, Plain City, OH (US)

( * ) Notice: Subject to any disclaimer, the term of this patent is extended or adjusted under 35 U.S.C. 154(b) by 721 days.

(21) Appl. No.: 11/959,459

(22) Filed: Dec. 18, 2007

(65) Prior Publication Data

US 2010/0098598 A1    Apr. 22, 2010

Related U.S. Application Data

(62) Division of application No. 10/384,169, filed on Mar. 7, 2003, now Pat. No. 7,326,394.

(51) Int. Cl.
*B01J 23/00* (2006.01)
*B01J 19/00* (2006.01)
*C22C 19/07* (2006.01)

(52) U.S. Cl. ........ 502/300; 502/313; 502/319; 502/320; 422/130; 422/240; 420/436

(58) Field of Classification Search .......... 502/313–316, 502/326, 339, 319, 320, 325, 327; 420/36, 420/95, 97, 436, 437, 445; 422/130, 222, 422/240

See application file for complete search history.

(56) References Cited

U.S. PATENT DOCUMENTS

| 3,907,708 | A | * | 9/1975  | Lacroix        | 502/221 |
|-----------|---|---|---------|----------------|---------|
| 4,021,373 | A |   | 5/1977  | Kane           |         |
| 4,104,360 | A |   | 8/1978  | Meguerian et al. |       |
| 4,116,884 | A | * | 9/1978  | Hayashi et al. | 502/257 |
| 4,581,157 | A | * | 4/1986  | Twigg          | 252/373 |
| 4,743,577 | A | * | 5/1988  | Schroeder et al. | 502/326 |
| 4,781,772 | A | * | 11/1988 | Benn et al.    | 148/404 |
| 4,863,893 | A |   | 9/1989  | Farrauto et al. |        |
| 4,994,430 | A |   | 2/1991  | Kotter et al.  |         |
| 5,102,639 | A |   | 4/1992  | Chou et al.    |         |
| 5,132,270 | A |   | 7/1992  | Wacholz        |         |
| 5,259,754 | A |   | 11/1993 | Dalla Betta et al. |    |

(Continued)

FOREIGN PATENT DOCUMENTS

GB        2077136        12/1981

OTHER PUBLICATIONS

Zwinkels et al., "Catalytic Materials for High Temperature Combustion," Catal. Rev. Sci. Eng. 35(3), 319-358 (1993).

(Continued)

*Primary Examiner* — Stanley Silverman
*Assistant Examiner* — Anthony J Zimmer
(74) *Attorney, Agent, or Firm* — Frank Rosenberg

(57) ABSTRACT

Catalysts are described in which an active catalyst is disposed on a low surface area, oxide support. Methods of forming catalysts are described in which a Cr-containing metal is oxidized to form a chromium oxide layer and an active catalyst is applied directly on the chromium oxide layer. Methods of making new catalysts are described in which the surface is sonicated prior to depositing the catalyst. Catalyst systems and methods of oxidation are also described. The inventive systems, catalysts and methods are, in some instances, characterized by surprisingly superior results.

19 Claims, 5 Drawing Sheets

U.S. PATENT DOCUMENTS

| | | | |
|---|---|---|---|
| 5,288,470 A * | 2/1994 | Cornelison et al. | 422/177 |
| 5,328,499 A * | 7/1994 | Poole et al. | 75/255 |
| 5,413,984 A | 5/1995 | Marecot et al. | |
| 5,577,906 A * | 11/1996 | Hanakata et al. | 431/268 |
| 5,877,107 A | 3/1999 | Zahn et al. | |
| 6,015,285 A * | 1/2000 | McCarty et al. | 431/7 |
| 6,284,210 B1 | 9/2001 | Euzen et al. | |
| 6,488,907 B1 * | 12/2002 | Barnes et al. | 423/418.2 |
| 7,087,651 B2 | 8/2006 | Lee-Tuffnell et al. | |
| 7,186,388 B2 | 3/2007 | Bowe et al. | |
| 7,189,271 B2 | 3/2007 | Maude et al. | |
| 7,223,373 B2 | 5/2007 | Maude et al. | |
| 2002/0013225 A1 * | 1/2002 | Figueroa et al. | 502/302 |
| 2002/0031471 A1 | 3/2002 | Tonkovich et al. | |
| 2003/0072699 A1 * | 4/2003 | Tonkovich et al. | 422/190 |

OTHER PUBLICATIONS

Christ et al., "Oxidation of Ni-Base Alloys in Atmospheres with Widely Varying Oxygen Partial Pressures," Oxidation of Metals, vol. 26 (1986) Plenum Publishing.

* cited by examiner

CATALYSTS, METHODS OF MAKING CATALYSTS, AND METHODS OF COMBUSTION

RELATED APPLICATIONS

This application is a divisional of U.S. patent application Ser. No. 10/384,169, filed Mar. 7, 2003 now U.S. Pat. No. 7,326,394.

BACKGROUND

Combustion catalysts have long been known and palladium-containing catalysts have been identified as among the most active catalysts for combustion. The compound $Pr_4PdO_7$, described by Chou et al. in U.S. Pat. No. 5,102,639, is one example of a Pd-containing catalyst. Dalla Betta et al. in U.S. Pat. No. 5,259,754 disclosed a Pd-on-zirconia catalyst; the zirconia could be a washcoat applied on a metal substrate. Euzen et al. in U.S. Pat. No. 6,284,210 described combustion catalysts containing: a metallic or ceramic monolithic substrate, an oxide coating (typically alumina), iron and cerium deposited on the oxide, and Pd and Pt.

Hanakata et al. in U.S. Pat. No. 5,577,906 disclosed a combustion catalyst in which Pd and/or palladium oxide are the main components of the active catalyst. These workers suggested a long list of possible cocatalysts including platinum, cerium and terbium. The active catalyst components can be mixed with a heat-resistant substance and deposited on a durable ceramic or metal support.

Not all combustion catalysts are based on noble metals. Other well-known catalysts are mixed oxides of perovskite structure and hexa-aluminates. General background information about catalytic materials for combustion can be found in "Catalytic Materials for High-Temperature Combustion", by M. Zwinkels et al., in Catalysis Review—Science and Engineering, 35(3), pp. 319-358, 1993. In a recent publication, Zarur et al. disclosed a new, highly active combustion catalyst made by sol-gel processing in reverse microemulsions. See "Reverse microemulsion synthesis of nanostructured complex oxides for catalytic combustion," Nature, 403, 55-57 (2000). The resulting ceria-promoted, barium hexa-aluminate nanoparticles were tested in the combustion of a reactant stream of 1% methane in air at a gas hourly space velocity ("GHSV") of 60,000 $h^{-1}$. In this system, full methane conversion was observed at 600° C.

The aforementioned patents discuss methods of preparing new catalysts. Some workers, however, have developed methods of refurbishing used catalyst structures. For example, Zahn et al. in U.S. Pat. No. 5,877,107 disclosed a process of cleaning or removing a catalyst coating from a catalytic converter by the use of ultrasound and flushing a honeycomb body with a chemically or mechanically active fluid.

While the invention described below focuses primarily on combustion catalysis, a few catalyst systems outside this field may be mentioned here. Twigg, in U.S. Pat. No. 4,581,157 described steam reforming catalysts that can have a metal substrate coated with a secondary oxide support that may contain a grain growth inhibitor such as cerium or praseodymium, and a group VIII metal active catalyst is disposed over the oxide. Meguerian et al. in U.S. Pat. Nos. 4,021,372 and 4,104,360 disclosed a process of making a catalyst for reducing nitrogen oxides in exhaust gas. In their process, a metal is plated on a metal support, heated in an inert atmosphere to interdiffuse the metals and then oxidized to form a surface oxide containing Cu, Ni, Fe, or Cr. Pfefferle in U.S. Pat. No. 5,466,651 disclosed a catalyst made by sputtering an admixture of a precious metal and a base metal oxide on a metal mesh support.

Barnes et al. in U.S. Pat. No. 6,488,907 disclosed catalytic partial oxidation methods and partial oxidation catalysts having a diffusion barrier coating on selected metal supports. The partial oxidation catalyst contains an alloy support that is heated in air or oxygen and then coated with a catalyst metal such as Rh, Pt, Ru, Ir, and Re. Barnes et al. suggested the use of supports in the form of gauzes, honeycombs or other configurations having longitudinal channels permitting high space velocities and a minimal pressure drop.

Barnes et al. reported examples of partially oxidizing methane at a methane:$O_2$ ratio of about 2 at gas hourly space velocities (GHSVs) of 100,000-140,000 $hr^{-1}$ to produce CO and $H_2$. It is well-known from the work of Barnes et al. and others that high gas space velocities can be used to obtain good yields in partial oxidation reactions even with catalysts with low surface area supports; however, it is also commonly believed that similarly high gas velocities cannot be successfully employed in comparable systems to obtain good yields in combustion reactions. Thus, relatively slower GHSVs and high surface area supports are the universal choice for catalytic combustors.

Despite these and many other efforts over the years, there remains a need for new catalysts, catalyst supports, and methods of combustion that reduce the cost and/or improve performance of combustion systems.

SUMMARY OF THE INVENTION

In a first aspect, the invention provides a method of combusting a carbon-containing compound, comprising: providing a gas mixture comprising CO or a hydrocarbon and an oxidant; and passing the gas mixture through a reaction chamber at a GHSV of at least 100,000 $h^{-1}$ and a temperature of 400 to 1100° C. The reaction chamber has an internal dimension of 1 cm or less, and a combustion catalyst is disposed in the reaction chamber. In this method, at least 20% of the CO or the hydrocarbon in the gas mixture is converted to $CO_2$.

In a second aspect, the invention provides a method of oxidizing a carbon-containing compound, comprising: providing a gas comprising CO and a hydrocarbon and an oxidant; and passing the gas through a reaction channel at a GHSV of at least 10,000 $h^{-1}$ and a temperature of 600 to 1100° C. The reaction channel has an internal dimension of 1 cm or less, and a combustion catalyst is disposed in the reaction chamber. In this method, pressure drop through the reaction chamber is 20 psi or less, or wherein the pressure drop through the reaction chamber is 3.0 psi per inch or less; and at least 20% of the hydrocarbon in the gas mixture is converted to $CO_2$.

The invention also includes methods of making a product from an endothermic reaction comprising passing an endothermic reaction composition into a reaction chamber that is adjacent to a reaction channel in which fuel is oxidized according to the methods of the invention (including any of the above-described aspects), and using heat generated from the oxidation of the carbon-containing compounds to add heat into the endothermic reaction. The invention also includes methods of making a product from an endothermic reaction comprising passing an endothermic reaction composition into an endothermic reaction chamber that is adjacent to a reaction channel in any of the catalyst systems described herein using heat generated from combustion to add heat into the endothermic reaction. Endothermic reactions are well-known and may include processes such as steam reforming and dehydrogenation.

In another aspect, the invention provides a catalyst system, comprising: a metal substrate comprising chromium and cobalt; and a chromium-containing oxide layer in direct contact with the metal substrate. The chromium-containing oxide layer has a surface that is not adjacent to the metal substrate and this surface has a Co:Cr ratio that is at least 50% less than the metal substrate. An active catalyst material is disposed on the chromium-containing oxide layer. The combination of the metal substrate, the active catalyst material and the chromium-containing oxide layer define a catalyst, that has a low surface area of no more than 0.5 $m^2/g$ or no more than 1 $m^2/inch^2$ of geometric surface area.

In a further aspect, the invention provides a catalyst system, comprising: a nickel-based, chromium-containing, metal substrate; a chromium-containing oxide layer in direct contact with the metal substrate; and an active catalyst material on the chromium-containing oxide layer. Prior to depositing the active catalyst material thereon, the oxide layer comprises at least 90 weight % chromia and has a Ni:Cr ratio of less than 0.005 as measured by XPS. In this aspect, the combination of the metal substrate, the active catalyst material and the chromium-containing oxide layer define a catalyst that has a low surface area of no more than 0.5 $m^2/g$ or no more than 1 $m^2/inch^2$ of geometric surface area.

In still another aspect, the invention provides a catalyst system, comprising: a reaction chamber comprising an outlet; a process stream in the reaction chamber; a gas stream passing through the outlet that contains $CO_2$ wherein the atomic ratio of C in the $CO_2$ to C in all other molecules in the gas stream is at least 1. The catalyst system also includes a metal substrate; a chromium- or aluminum-containing oxide layer in direct contact with the metal substrate; and an active catalyst material on the chromium- or aluminum-containing oxide layer where the combination of the metal substrate, the active catalyst material and the chromium- or aluminum-containing oxide layer define a catalyst that has a low surface area of no more than 0.5 $m^2/g$ or no more than 1 $m^2/inch^2$ of geometric surface area.

In preferred embodiments, the metal substrate is part or all of a reaction chamber wall.

In a further aspect, the invention provides a catalyst system, comprising: a reaction chamber and a catalyst, wherein the catalyst comprises: a metal substrate; an oxide layer disposed on the metal substrate; and a combustion catalyst on the oxide layer. The reaction chamber has an internal dimension of 1 cm or less, and a combustion catalyst is disposed within the reaction chamber. The catalyst system is characterizable by a combustion activity such that:

when a gas mixture containing 9 volume % $CH_4$, 1.9 vol. % $O_2$, and 89 vol. % $N_2$ is passed through the reaction chamber at a GHSV of $1.6 \times 10^6$ $h^{-1}$ and a temperature in the reaction chamber of 835° C., there is a $CH_4$ conversion of at least 9% and an $O_2$ conversion of at least 50%; or when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6$ $h^{-1}$ and a temperature in the reaction chamber of 710° C., there is a CO conversion of at least 80%; or when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6$ $h^{-1}$ and a temperature in the reaction chamber of 910° C., there is a CO conversion of at least 90%. These representative characteristics are based on unexpected results as are shown in the Examples section.

In another aspect, the invention provides a method of combusting a fuel to heat an adjacent stream, comprising: providing a gas mixture comprising CO or a hydrocarbon and an oxidant; passing the gas mixture into at least one reaction chamber at a GHSV of at least 10,000 $h^{-1}$ and a temperature of 400 to 1100° C.; and combusting the CO or a hydrocarbon with the oxidant to produce heat sufficient to create a heat flux, at steady-state, of at least 10 W per $cm^2$ of the catalyst geometric surface adjacent to a cooling chamber. In this method, the at least one reaction chamber has an internal dimension of 1 cm or less, and a combustion catalyst is disposed in the at least one reaction chamber and is adjacent to at least one reaction chamber wall. A bulk flow path is present though the at least one reaction chamber. The at least one reaction chamber has an internal surface area that is defined by the area of the at least one reaction chamber wall that is coextensive with the combustion catalyst. Further, in this method, there is at least one coolant chamber adjacent to the at least one reaction chamber wall. The at least one reaction chamber and the at least one coolant chamber define an integrated combustion reactor. The heat flux that is generated in this and other combustion processes described herein is much greater than a partial oxidation process. In preferred embodiments, the level of heat flux is at least 20 W per $cm^2$, more preferably at least 30 W per $cm^2$, and in some embodiments 10 to 100 W per $cm^2$ of the catalyst geometric surface adjacent to a cooling chamber.

In a further aspect, the invention provides a catalyst system, comprising: at least one reaction chamber comprising at least one reaction chamber wall where the at least one reaction chamber has an internal dimension of 1 cm or less. A combustion catalyst is disposed in the at least one reaction chamber and is adjacent to the at least one reaction chamber wall. A bulk flow path is present though the at least one reaction chamber. The at least one reaction chamber has an internal surface area that is defined by the area of the at least one reaction chamber wall that is coextensive with the combustion catalyst. At least one coolant chamber is adjacent to said at least one reaction chamber wall. The at least one reaction chamber and the at least one coolant chamber define an integrated combustion reactor (ICR). This system is characterizable by a combustion activity such that, when a gas mixture comprising 8.7% methane and 91.3% air is passed into the at least one reaction chamber at a gas feed rate/ICR volume of 2000 $h^{-1}$ and an endothermic gas stream passed through the coolant stream at a rate such that thermal equilibrium is obtained; sufficient heat is produced to create a heat flux, at steady-state, of at least 1 W per cc (more preferably at least 2 W per cc, and in some embodiments 1 to 15 W per cc) of the integrated combustion reactor. This combustion activity is a convenient measure of the "effective compactness" of an integrated combustion reactor and in many cases can be simply determined by measuring the exterior dimensions of a device and the change in composition of the gas feed. In a device with multiple functionalities, the volume of the ICR should be based on only the portion of the device devoted to the combustion chamber(s) and the coolant (typically, endothermic reaction) chamber(s).

The invention also provides a catalyst system, comprising: a nickel-based, chromium-containing, metal substrate; a chromium-containing oxide layer in direct contact with the metal substrate; and an active catalyst material on the chromium-containing oxide layer. In this system, the surface of the oxide layer has a composition that can be clearly defined by its composition prior to depositing the active catalyst material thereon. In the state prior to deposition, the surface of the oxide layer comprises at least 90 weight % chromia and has a Ni:Cr ratio of less than 0.005 as measured by XPS. In most cases, this ratio can be alternatively be determined on a surface of the finished catalyst system where the step of depositing the active catalyst material doesn't interfere with the measurement. In this system, the combination of the metal substrate, the active catalyst material and the chromium-containing oxide layer define a catalyst, that has a low surface area of no more than $0.5\ m^2/g$ or no more than $1\ m^2/inch^2$ of geometric surface area.

In another aspect, the invention provides a catalyst system, comprising: a reaction chamber comprising an outlet; a process stream in the reaction chamber; a gas stream passing through the outlet comprising $CO_2$ wherein the atomic ratio of C in the $CO_2$ to C in all molecules in the gas stream is at least 0.2 (more preferably an atomic ratio of at least 0.3, 0.5, 0.8, or 0.99); a metal substrate; a chromium- or aluminum-containing oxide layer in direct contact with the metal substrate; and an active catalyst material on the chromium- or aluminum-containing oxide layer. The combination of the metal substrate, the active catalyst material and the chromium- or aluminum-containing oxide layer define a catalyst, that has a low surface area of no more than $0.5\ m^2/g$ or no more than $1\ m^2/inch^2$ of geometric surface area.

In another aspect, the invention provides a method of making a catalyst, comprising: oxidizing a new metal support to form a metal with a layer of surface oxide; wherein the new metal support has not previously been part of a catalyst structure; sonicating the structure containing the metal support and the surface oxide; and depositing an active catalyst material on the surface oxide layer.

The invention further provides a method of making a catalyst, comprising:

step (a) oxidizing a nickel-based, chromium-containing metal by heating the metal to a temperature of at least 850° C. in the absence of oxygen and then exposing the metal to an oxygen-containing atmosphere at a temperature of at least 850° C. to form a nickel-based, chromium-containing metal with a chromium-containing metal oxide surface layer; and step (b) depositing an active catalyst material directly on the chromium-containing metal oxide surface layer of step (a).

The invention includes catalysts made by the inventive methods.

The invention also includes methods of oxidizing fuels utilizing any of the catalysts (including catalysts made by the inventive methods) or catalyst systems described herein. For example, the invention includes a method of oxidizing a fuel comprising passing a fuel and an oxidant over a catalyst comprising: a metal substrate; a chromium- or aluminum-containing oxide layer in direct contact with the metal substrate; and an active catalyst material on the chromium- or aluminum-containing oxide layer. The combination of the metal substrate, the active catalyst material and the chromium- or aluminum-containing oxide layer define a catalyst, and the catalyst has a low surface area of no more than $0.5\ m^2/g$ or no more than $1\ m^2/inch^2$ ($0.16\ m^2/cm^2$).

The catalysts and/or combustion methods of the present invention have numerous uses, such as: providing heat to drive processes in a chemical reactor; providing heat to a system; reducing emission of CO and hydrocarbons into the atmosphere by converting them into $CO_2$ and water before being exhausted; allowing the combustion to occur at low enough temperatures such that the formation of NOx is reduced.

Various embodiments of the present invention may provide advantages, such as one or more of the following: low cost, ease of manufacture, heat generation at exact locations where it's needed, high energy efficiency due to low heat-transfer resistance, durability, stability, excellent adhesion between materials, ability to perform at high temperature, achievement of desired performance such as conversion, gas hourly space velocity, low pressure drops, selectivity, etc., ability to operate under a variety of conditions including temperature, pressure and fuel composition, and compactness.

Glossary

"Active catalyst material" means an active catalyst or a precursor to an active catalyst.

Gas hourly space velocity (GHSV) is defined based on the reactor volume where catalyst is present and temperature is sufficiently high for combustion to occur.

Throughout the descriptions of this invention, "%" refers to weight % in the solid composition.

The phrase "the atomic ratio of C in the $CO_2$ to C in all molecules in the gas stream" means, for example, that a stream containing 1 mole $CO_2$ and 2 moles ethane would have an "atomic ratio of C in the $CO_2$ to C in all molecules in the gas stream" of 0.2.

A layer that is "directly" on a substrate contacts the substrate without the presence of intervening layers.

"Heat flux, at steady-state, of at least 10 W per $cm^2$ of the catalyst geometric surface adjacent to a cooling chamber" refers to the amount of heat transferred through a catalyst structure into a cooling chamber. It is calculated based on the portion of the geometric area of combustion catalyst within a reaction chamber that is adjacent to a cooling chamber and the amount of heat can be calculated from the change in chemical composition of the reactant stream in either the combustion stream or in the endothermic process stream (if present) in the coolant chamber.

For purposes of defining the present invention, the term "or" is synonymous with "and/or."

By "on the oxide layer" is meant either on top or within pores and crevices within an oxide layer.

An "outlet" of a reaction chamber is where the active catalyst material stops; for example the end of the shaded area in FIG. 3. Measurements on a gas stream at an outlet can be made at the outlet or at any subsequent point provided there is not a substantial change in the composition of a process stream as it travels from an outlet to the subsequent point. If it is impractical to measure directly at the outlet, the carbon dioxide content may be calculated.

A hydrocarbon is a compound containing a CH bond and may be an alcohol.

Surface area per $inch^2$ or per $cm^2$ is per geometric surface area.

"Per inch or per cm of reaction chamber" is from the beginning of a catalyst to the end of the catalyst in the reaction chamber; that is, it counts only the length of reaction chamber where catalyst is present.

For specified temperatures within a reaction chamber, such as 835° C., the temperature should be controlled to obtain this temperature within the reaction chamber. These specified temperatures are for characterizing the catalyst, and, for this purpose, the system should, where practicable, be controlled to obtain this same temperature over the entire catalyst. In devices where the temperature cannot be controlled to be the same over the entire catalyst, then the specified temperature is an average temperature of the catalyst that should be controlled to the extent reasonably practicable. Typically, temperatures are measured by thermocouples within and/or at the outlet of a reaction chamber; however, in devices without thermocouples, average temperatures can be obtained via model calculations. In devices with adjacent endothermic chambers or cooling chambers, flow in these adjacent chambers may be controlled, through routine experimentation, to obtain the specified temperature and the desired claimed characteristic.

DESCRIPTION OF PREFERRED EMBODIMENTS

Figure 1:
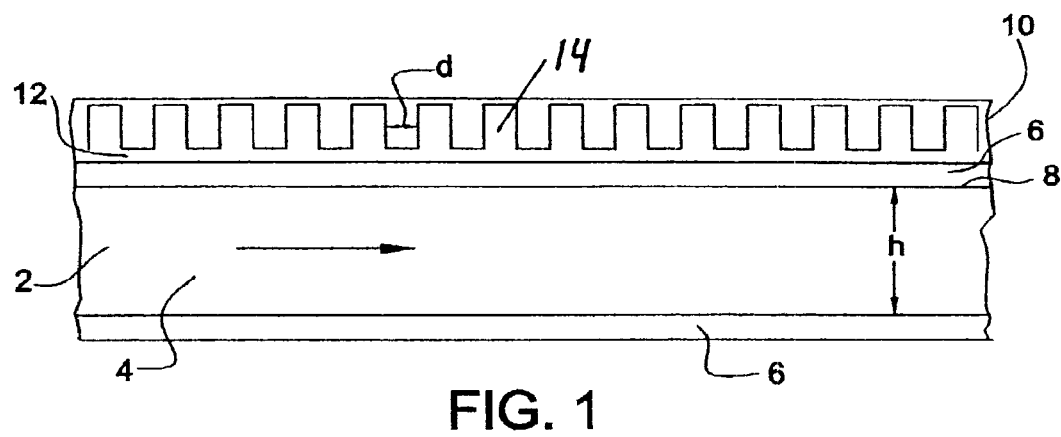
FIG. 1 is a representational, cross-sectional view of apparatus that can be utilized in the present invention.

The catalyst system of the invention preferably contains a metal substrate, a metal oxide layer as a support for a catalytically active material. The substrate metal preferably contains sufficient chromium such that the metal can be oxidized to produce an oxide layer that contains at least 50% Cr oxide (based on $Cr_2O_3$). The metal preferably contains at least 10% Cr, more preferably at least 15%, still more preferably at least 20%, and in some embodiments, 15 to 30% Cr. In some preferred embodiments, the metal support is nickel-based, preferably containing greater than 40% Ni. In some preferred embodiments, the metal may contain 2 to 15% Mo. The metal may (and typically will) contain numerous other elements; however, in preferred embodiments, the metal contains little Al or Zr meaning that the levels of Al and Zr are sufficiently low such that Cr in the oxide layer outweighs the sum of Al+Zr; in preferred embodiments, the metal contains 10% or less Al+Zr, more preferably 5% or less, and still more preferably 2% or less of Al+Zr. In some preferred embodiments, the metal is a metal designed for extended use at high temperature. Particular Cr-containing metals that are commercially available include Inconel® 617, Inconel® 625, and Haynes® 230. Preferably, when the metal is heated in the presence of oxygen, an adherent oxide layer forms over all the exposed surfaces of the metal.

Superior results have been obtained with a chromia native oxide layer as a catalyst support. It is contemplated that other native oxide layers could be used as the support. For instance, FeCrAlY and Inconel 693 would form a layer of alumina when heat treated. The native alumina could be used to support active catalyst materials.

Typically, the catalyst has the shape of the metal substrate. Examples of catalyst shapes include sheets, tubes (preferably with a catalyst on the interior of the tube), rods, wires, foils, honeycombs, and more complex shapes such as reactor components, engine components, etc. A "component" means a designed structural piece such as an exhaust channel, a combustion chamber, a manifold, etc.; "component" does not mean a conventional catalyst powder or pellet, etc. A significant advantage of the present invention is that a metal can be worked into any desired shape and oxidized (preferably after shaping) to produce a catalyst support. The metal substrate can be a Cr-containing metal coating on a ceramic base or on another metal; however, in some preferred embodiments, the metal substrate consists essentially of a single metal alloy that is not coated on another base material. The metal substrate can be of any thickness, but in some preferred embodiments, the substrate has a thickness of 1 mm or less, and in some embodiments a thickness of from 0.1 to 0.5 mm. Substrates of 1 mm or less can be especially desirable for use as a wall that separates a reaction chamber (especially a combustion chamber) from a second reaction chamber (especially an endothermic reaction chamber); this configuration allows the most efficient thermal transfer from the active catalyst material through the chamber wall directly into the second reaction chamber.

An adherent metal oxide overlies and is directly adjacent to the metal. Preferably, the metal oxide is formed by thermal oxidation of the metal to form an oxide layer that is integral to the metal support. Preferably, the oxide layer contains at least 50%, more preferably at least 90%, and in some embodiments, from 80 to 100% Cr oxide. In preferred embodiments, the substrate has more Ni than Cr, but the oxide layer has a Cr:Ni weight ratio of at least 2:1, more preferably at least 5:1. Preferably, Cr is the most abundant metal element in the coating (for purposes of the present invention, Al and Si are considered metals). In some preferred embodiments, the metal oxide contains less than 5% of any of the elements Al, Si, Zr, and a sum of less than 10% of these three elements. The metal oxide layer could be dense and low in porosity. The density of the metal oxide layer could be derived from the weight gain and the thickness of the oxide layer after oxide formation. In a preferred embodiment, the oxide layer has a density of at least 80%, more preferably at least 95% of the theoretical density of $Cr_2O_3$. That means the porosity of the oxide is lower than 20% in a preferred embodiment, or more preferably lower then 5%. Porosity could be derived from the weight gain or measured by nitrogen adsorption or other techniques. In some preferred embodiments, the metal oxide may contain 0.2 to 10% oxides of Ti, Co, Ni or Mo, or combinations thereof. In further preferred embodiments, as measured by X-ray photo-electron spectroscopy (XPS), the oxide surface has a Ni:Cr atomic ratio of 0.05 or less, more preferably 0.010 or less, and still more preferably less than 0.0050. in some preferred embodiments, the metal substrate contains Ni, Cr and Co and the surface of the oxide has a Cr:Co atomic ratio that is 0.5 less, more preferably 0.1 or less, and still more preferably 0.02 or less (as measured by XPS). The oxide layer preferably has a thickness, as measured on a cross section by SEM (scanning electron microscopy), of from 0.1 to 100 μm (micrometers), more preferably 0.5 to 10 μm. The elemental composition can be measured by energy dispersion spectroscopy (EDS) or wavelength dispersion spectroscopy (WDS) if the oxide layer is at least 3 microns thick, or by XPS depth profiling if the oxide layer is thinner. The oxide surface, either after and/or prior to deposition of a catalytically active material, can have a surface area lower than 1 $m^2$ per square inch (0.16 $m^2/cm^2$) of the geometric surface area; in some embodiments the surface area is lower than 0.2 $m^2/inch^2$ (0.03 $m^2/cm^2$) of the geometric surface area. The "geometric surface area" is typically an area of a reaction chamber wall or walls; it may be a flat or a curved surface, but it does not include surface area contributed by microscopic porosity or microscopic surface roughness. Alternatively, the metal oxide or catalyst preferably has a surface area, as measured by $N_2$ adsorption as described in the Examples, of 0.5 $m^2/g$ or less, and in some preferred embodiments 0.1 $m^2/g$; for this measurement, $N_2$ adsorption is carried out on a piece of catalyst, or catalyst intermediate, including substrate. The oxide layer is typically dull and non-reflecting. It is typically polycrystalline and has a rough surface as observed under a scanning electron microscope at a magnification of 5,000 times. In some preferred embodiments, the oxide surface comprises conglomerates of crystallites of 0.1 to 10 microns in size (maximum diameter, as observed by the microscope). The oxide layer typically adheres well to its parent metal, and has a good thermal stability up to its formation temperature. All of the forgoing surface area descriptions apply to both the metal oxide layer surface (for example, as an intermediate), and after deposition of an active catalyst (either as an intermediate or the final catalyst); some preferred embodiments of the final catalyst will exhibit the above-described surface area characteristics.

The metal oxide is preferably formed by thermal oxidation of a metal support. In some preferred methods, the metal surface is cleaned prior to oxidation, such as by degreasing with an organic solvent or an alkaline solution, and/or chemical etching with an acid, preferably followed by rinsing with water, and drying with flowing nitrogen or air at temperatures around 80-150° C. Preferably, oxidation is carried out in the presence of molecular oxygen, most conveniently in the form of air. In some preferred embodiments, oxidation is carried out at temperatures of at least 700° C., more preferably at least 850° C. Surprisingly, it has been discovered that higher oxidation temperatures result in greater catalyst loadings than lower temperatures. For nickel-based alloys, oxidation is preferably conducted at a temperature in the range of 850 to 1100° C., more preferably 900 to 1050° C.; and for a time that is preferably in the range of 0.5 to 20 hours. The oxidation can be conducted in an ambient environment or under the flow of an oxidizing gas. It was surprisingly discovered that essentially excluding oxygen during heat-up produced a surface free of Ni or Co. Thus, in some preferred embodiments, oxidation is done only after a high temperature is reached. In some preferred embodiments, an inert gas or a mixture including $H_2$ and $H_2O$ is used during temperature ramp-up. For purposes of the present invention, "essentially excluding oxygen" or heating "in the absence of oxygen" means keeping oxygen sufficiently low (typically at less than a part per million) such that the surface has 0.00 atom/atom Ni/Cr and 0.00 atom/atom Co/Cr as measured by XPS.

Optionally, the catalyst intermediate structure with a surface metal oxide is subjected to a sonication step. Sonication can be performed with the catalyst substrate with its oxide layer submerged in a water bath while sonicated. Sonication duration and energy intensity can be controlled to achieve different degrees of material removal. A typical sonic power density is between 1 and 50 W/(cm$^2$ of metal that is coated with the oxide), with a duration of sonication of between 1 and 60 min. It has been surprisingly discovered that sonicating a substrate with metal oxide surface layer causes changes in the metal oxide surface layer that results in a more active catalyst. This result is found after an active catalyst material is deposited on the (previously sonicated) metal oxide.

The catalyst system also includes an active catalyst on the metal oxide. The active catalyst is compositionally different from the metal oxide support and will depend on the type of reaction to be catalyzed. Preferred active catalysts are combustion catalysts and can include, for example, noble metals such as Pt, Rh, Pd; Co, Cu, Mn, Fe, Ni; oxides of any of these metals; perovskites and aluminates. In some preferred embodiments, an active catalyst is accompanied by an activity-enhancing promoter such as cerium, terbium and praseodymium, their oxides, and combinations thereof. In some preferred embodiments, a promoter element is present in at least a 1:1 molar ratio as compared to the active catalyst element or elements, and in some embodiments a promoter element is present in the range of 0.5:1 to 10:1 molar ratio as compared to an active catalyst element (moles promoter(s): moles active catalyst element(s)).

Typically, the active catalyst material is deposited after the formation of a metal oxide (and, optionally, after sonication). An active catalyst material is either an active catalyst or a precursor to an active catalyst. Palladium nitrate is one example of a suitable precursor. Preferably, the active catalyst material as well as any promoters are applied without adding any additional support materials (that is, no alumina washcoat, etc.)—another way of stating this is that the step of adding an active catalyst material consists essentially of adding an active catalyst material and, optionally, a promoter—this means that the step excludes the presence of other components that would have a substantial effect on the properties of the resulting catalyst. In some preferred embodiments, the active catalyst material(s) and any promoter(s) are added in a solution (not a suspension) by a step such as dip coating, spray coating, etc. The amount of active catalyst loaded can be controlled by the concentration of the coating solution and the number of coatings. In some preferred embodiments, after depositing an active catalyst material, the catalyst is dried and calcined. Calcination could be done, for example, in a stagnant or flowing atmosphere, such as air, by ramping the temperature up and holding at a certain temperature for a certain time. In some preferred embodiments, the calcination temperature is between 400 and 1050° C.

The catalyst system may also include devices that incorporate the catalyst. Examples of such devices include combustors and integrated combustion reactors, catalytic converters for automotive emission control, and power generators. In some preferred embodiments, the catalyst is disposed on one or more surfaces in a channel that has at least one dimension of 10 mm or less, more preferably 2 mm or less, still more preferably 1 mm or less, and in some embodiments from 50 µm to 1 mm. Reaction channels with a small cross-sectional area (measured in the direction perpendicular to flow and measured from wall to wall in the interior of a reaction channel) are particularly desirable for the inventive catalytic systems, preferably a reaction channel has a cross-sectional area of 100 mm$^2$ or less, more preferably 10 mm$^2$ or less, and still more preferably, 1 mm$^2$ or less. Typically, the length of a reaction chamber (the direction of flow) is at least 1 cm and is substantially longer than height and width, which are perpendicular to flow. A reaction chamber whose height and/or width is the smallest dimension is also called "a reaction channel."

Figure 3:
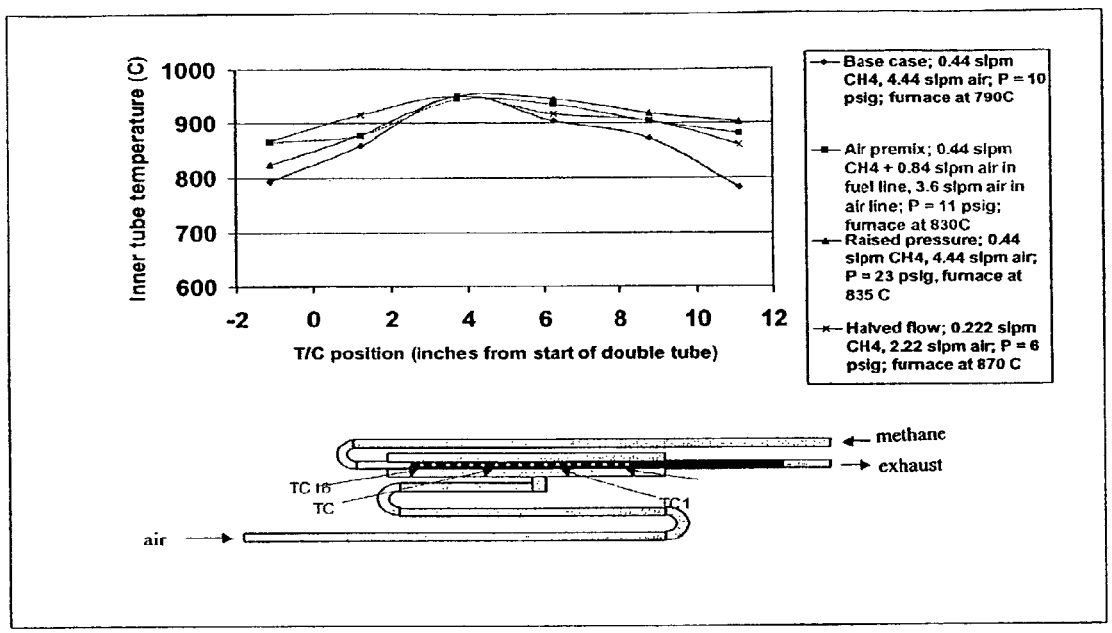
FIG. 3 shows a temperature profile (top) and schematic illustration of testing equipment (bottom) used in the tube-in-tube configuration of the Examples section.

In a particularly preferred embodiment, a combustion catalyst is disposed on a surface in a reaction chamber and at least one wall of the reaction chamber contains orifices for distributed flow of a reactant into the reaction chamber; for example, orifices that allow a distributed flow of air or oxygen along the flow path in the reaction chamber so that fuel passing through the reaction chamber encounters a more even distribution of oxygen, rather than the highest concentration at or near the inlet to the reaction chamber that diminishes as the reaction proceeds. One such example is shown in FIG. 3. In one particularly preferred embodiment, a reaction channel has its height or width defined by opposing walls in which one wall has the inventive catalyst on the surface and the opposite wall has orifices that connect an oxidant supply; in this configuration, the oxidant flows through the orifice and impacts the catalyst wall and combusts, and heat is transferred directly through the catalyst wall into an adjacent endothermic reaction chamber. Preferably, the distance from the orifice to the catalyst wall is 2 mm or less. In an alternative embodiment, fuel is passed, in a distributed fashion, through orifices into an oxidant stream flowing through a reaction chamber.

Some reactor configurations suitable for the catalyst system are described in U.S. patent application Ser. No. 10/222,196, filed Aug. 15, 2002, which is incorporated herein as if reproduced in full below.

The reactors preferably include a plurality of microchannel reaction channels. The plurality of microchannel reaction channels may contain, for example, 2, 10, 100, 1000 or more channels. Typically, flow into and/or out of some or all of these channels passes through a manifold or manifolds that combines the fluid flow. In preferred embodiments, the microchannels are arranged in parallel arrays of planar microchannels to form a layer of microchannels.

In some embodiments, a reaction microchannel (or microchannels) contains a bulk flow path. The term "bulk flow path" refers to an open path (contiguous hulk flow region) within the reaction chamber. A contiguous bulk flow region allows rapid gas flow through the reaction chamber without large pressure drops. In preferred embodiments there is laminar flow in the bulk flow region. Bulk flow regions within each reaction channel preferably have a cross-sectional area of $5 \times 10^{-8}$ to $1 \times 10^{-2}$ m$^2$, more preferably $5 \times 10^{-7}$ to $1 \times 10^{-4}$ m$^2$. The bulk flow regions preferably comprise at least 5%, more preferably 30-80% of either 1) the internal volume of the reaction chamber, or 2) the cross-section of the reaction channel.

A representational view of an apparatus of some embodiments of the present invention is illustrated in FIG. 1. This view represents one simplified example and should not be understood to limit the invention. A reaction chamber 2 contains a bulk flow path 4. The reaction chamber is defined on two sides by reaction chamber walls 6 and 6'. The internal dimension h is the distance from the surface of the metal wall to the surface of the metal in the opposing wall and does not include the thickness of any oxide layer (not shown). A coolant chamber 10 is adjacent to reaction chamber 2. The illustrated coolant chamber has fins having a thickness d interleaved with coolant channels 14 and a gap 12 between the fins and the channel wall 6. The illustrated embodiment is crossflow; however, co-flow and counter-flow may also be employed. In preferred embodiments, an endothermic reaction is occurring in the coolant channel; however, a cool, non-reacting stream could alternatively be used. In a preferred embodiment, orifices (not shown) in reaction chamber wall 6' connect the reaction chamber 2 with a distributed feed channel (not shown). Preferably the feed channel contains an oxidant. A reactant in the distributed feed channel flows through the orifices and impinges against surface 8 where it combusts and heat is directly transferred through chamber wall 6 into the coolant chamber.

In some embodiments of the inventive reactor or method, the reactor (or method) is configured to send the product stream into a second reactor or recycle the product stream back into the same reactor. In some preferred embodiments, multiple endothermic reaction channel layers are interleaved with multiple combustion channel layers (for example, at least 10 endothermic reaction channel layers interleaved with at least 10 combustion channel layers). The combustion channel layers may be comprised of a combustion channel sublayer with an adjacent oxidant channel sublayer; typically these sublayers are connected via orifices for distributed flow.

Preferred embodiments of the inventive catalyst system and/or methods can be characterized by physical or functional characteristics, such as having a combustion activity such that when a gas mixture containing 9 volume % $CH_4$, 1.9 vol. % $O_2$, and 89 vol. % $N_2$ is passed through the reaction chamber at a GHSV of $1.6 \times 10^6$ h$^{-1}$ and a temperature in the reaction chamber of 835° C., there is a $CH_4$ conversion of at least 9% and an $O_2$ conversion of at least 40%, and preferably additionally having one or more of the following: a $CO_2$ selectivity of at least 50%, more preferably at least 60%, and in some embodiments a $CO_2$ selectivity of 50% to 76%; a $CH_4$ conversion of at least 12%, and in some embodiments 9% to 16%; an $O_2$ conversion of at least 60%, and in some embodiments 55% to 90%. This combustion activity is to be measured after at least 10 minutes of operation at these conditions; and temperature at 835° C. controlled to the extent practicable.

Alternatively, preferred embodiments of the inventive catalyst system and/or methods can be characterized by a combustion activity such that when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6$ h$^{-1}$ and a temperature in the reaction chamber of 710° C., there is a CO conversion of at least 80%, and preferably additionally having one or more of the following: a CO conversion of at least 95%; a $CH_4$ conversion of at least 5%, more preferably at least 10%, and in some embodiments a $CH_4$ conversion of 5% to 11%; a $H_2$ conversion of at least 90%, more preferably at least 99%; an $O_2$ conversion of at least 30%, more preferably at least 40%, and in some embodiments 30% to 41%. This combustion activity is to be measured after at least 10 minutes of operation at these conditions; and temperature at 710° C. controlled to the extent practicable.

Alternatively, preferred embodiments of the inventive catalyst system and/or methods can be characterized by a combustion activity such that when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6$ h$^{-1}$ and a temperature in the reaction chamber of 910° C., there is a CO conversion of at least 90%, and preferably additionally having one or more of the following: a CO conversion of at least 99%; a $CH_4$ conversion of at least 10%, more preferably at least 15%, and in some embodiments a $CH_4$ conversion of 10% to 20%; a $H_2$ conversion of at least 99%; an $O_2$ conversion of at least 30%, more preferably at least 40%, and in some embodiments 30% to 44%. This combustion activity is to be measured after at least 10 minutes of operation at these conditions; and temperature at 910° C. controlled to the extent practicable.

The invention also includes methods of oxidizing a carbon-containing compound or a fuel. Fuels are compounds that react exothermically with an oxidant. Examples of preferred fuels include: hydrogen, $C_1$ to $C_{10}$ hydrocarbons including methane, ethane, etc., natural gas, liquid petroleum gas ("LPG" a mixture that may contain propane, butane and pentane), gasoline, $C_1$ to $C_{10}$ alcohols, CO, and oxygenates such as alcohols and ethers. In some embodiments of the invention, the CO or hydrocarbon in the reactant stream consists essentially of methane, ethane, or propane; and in other embodiments consists essentially of CO. In some embodiments, the reactant stream is the product of a partial oxidation reaction. The net amount of gases added to a combustion chamber preferably comprise fuel and oxidant in a (carbon atom): (oxidant atom) ratio of 1:100 to 100:1, more preferably 1:10 to 10:1, and still more preferably 1:5 to 5:1. In some preferred embodiments, the C:O atomic ratio in the gas mixture (where "C" refers to carbon atoms in the CO or hydrocarbon and "O" refers to oxygen atoms in the oxidant) is 1:1 or less, and in some preferred embodiments, 1:2 or less. A preferred oxidant is oxygen, which may come from air. Preferred parameters for conducting oxidation reactions include any combination selected from the following: temperature ranges of 400 to 1100° C., 750 to 1000° C., and 850 to 950° C.; selectivities to $CO_2$ of at least 30%, more preferably at least 50%, still more preferably at least 80%, and still more preferably at least 99%; pressure at the inlet to a reaction channel preferably ranges from 0.1 to 30 atm, and in some embodiments 1 to 10 atm. In some preferred embodiments, there is an excess air of 0 to 50%, more preferably 0-20%.

In preferred embodiments, the pressure drop through a reaction channel (from inlet to outlet) is 20 psi (also known as psid, pounds per square inch differential, 1.4 Bar) or less, more preferably 10 psi (0.7 Bar) or less; where these pressure drops are corrected for changes in temperature within the system. In some preferred embodiments, the inventive method utilizes a gas mixture with a gas hourly space velocities (GHSV) of at least $10^4$ $h^{-1}$, more preferably at least $10^5$ $h^{-1}$, and in some embodiments $10^6$ to $10^7$ $h^{-1}$. In some preferred embodiments, the pressure drop through a reaction channel is 3.0 psi per inch of reaction chamber (0.5 Bar per cm) or less, more preferably 1.0 psi (0.2 Bar per cm) or less; where these pressure drops are corrected for changes in temperature.

In some embodiments, air or another oxidant can be pre-mixed with fuel prior to oxidizing; this can be done with or without a subsequent distributed flow of oxidant into a reaction chamber. In any embodiment, oxidation can be partial oxidation or full combustion.

EXAMPLES

Surface Oxidation of Inconel®

Samples of Inconel 625® were oxidized by heating in air. Elemental analyses were preformed on samples oxidized (in separate experiments) for 100 hours at 750° C., 10 hours at 850° C., and 2 hours at 950° C. These treatments resulted in oxide layer thicknesses of 470 nm, 720 nm and 1060 nm, respectively. A photomicrograph of a cross-section of the sample oxidized for 10 hours at 850° C. is shown in FIG. 1; elemental analyses corresponding to locations A-E are shown in Table A.

TABLE A

Elemental Analysis Corresponding to FIG. 1.

| Spectrum | C | O | Si | Cr | Fe | Ni | Nb | Mo |
|---|---|---|---|---|---|---|---|---|
| A | 10.2 | 24.1 | 0.3 | 41.3 | 0.6 | 20.9 | 1.2 | 1.4 |
| B | 11.2 | 24.8 | 0.4 | 39.8 | 0.6 | 20.6 | 1.3 | 1.4 |
| C | 10.9 | 22.6 | 0.2 | 40.8 | 0.7 | 21.5 | 1.2 | 2.0 |
| D | 16.0 | 1.8 | 0.2 | 15.0 | 2.3 | 57.4 | 1.8 | 5.5 |
| E | 14.0 | 0.0 | 0.1 | 21.9 | 1.8 | 56.5 | 1.6 | 4.1 |

It was found that the exterior oxide layer is primarily chromium oxide, but other elements remain on the exterior. The carbon content reported in the table is a non-representative artifact. A layer of carbon was deposited on the sample before analysis as part of the standard procedure for SEM sample preparation. True carbon content in the oxide layer is believed to be close to none. It was also found that sonicating the metal with the oxide layer (that is, after the surface oxide was grown) resulted in a rougher oxide surface.

It was unexpectedly found that the composition of the oxide layer can be controlled by the temperature of oxidation. Table B compares the average oxide layer compositions of the samples. It shows clearly that raising the oxidation temperature suppresses the Ni oxide content and raises the content of chromium oxide in the oxide layer.

TABLE B

Average thickness and composition (excluding carbon) of the oxide layer grown on Inconel 625 ® at different temperatures

| Oxidation condition | Average oxide layer thickness, micron | Cr wt. % in the oxide layer | Ni wt. % in the oxide layer | Wt. % of other elements in the oxide layer | O wt. % of the oxide layer |
|---|---|---|---|---|---|
| 750 C., 100 hr | 0.47 | 41 | 30 | 4 | 25 |
| 850 C., 10 hr | 0.72 | 46 | 24 | 3 | 27 |
| 950 C., 2 hr | 1.06 | 57 | 10 | 2 | 31 |

The presence of Ni in the oxide layer is often considered undesirable because Ni is known to be active in catalyzing coke formation. Other elements such as Co may also have catalytic activity. To better detect and quantify the presence of Ni and Co at the surface of the oxide layer, XPS is used. XPS is a surface sensitive technique that detects elements in the few top-most atomic layers of the solid. Table C compare the Ni and Co presence relative to Cr presence at the surface of the oxide layer on Inconel 617® grown under different conditions. One sample was oxidized in air, with the temperature being ramped up from room temperature ("r.t.") to 1,000 C. at 3.5 C/min, held at 1,000 C. for 10 hr, and ramped down to r.t. at 3.5 C/min. The other sample was heated from r.t. to 900 C. at 3.5 C/min in a flowing mixture of $H_2$, $H_2O$ and $N_2$, with a $H_2/H_2O$ molar ratio of 10. The gas stream was switched to purified $N_2$ at 900 C. and ramped up to 1,000 C. at 3.5 C/min. At 1,000 C., the gas stream was switched to air, temperature was held at 1,000 C. for 10 hr, then ramped down at 3.5 C/min to r.t. As can be seen in Table C, by controlling the environment during heat-up, a surface free of Ni and Co is achieved.

TABLE C

XPS surface analysis of Inconel 617 ® before and after oxidation under different heat-up environments (oxidation was done in air at 1,000 C. for 10 hr, with heat-up in different gas environments)

| | XPS Ni/Cr, atom/atom | XPS Co/Cr, atom/atom |
|---|---|---|
| Surface before oxidation | 0.67 | 0.09 |
| Surface after oxidation with air heat-up | 0.01 | 0.08 |
| Surface after oxidation with heat-up in a $H_2$, $H_2O$ mixture | 0.00 | 0.00 |

Figure 4:
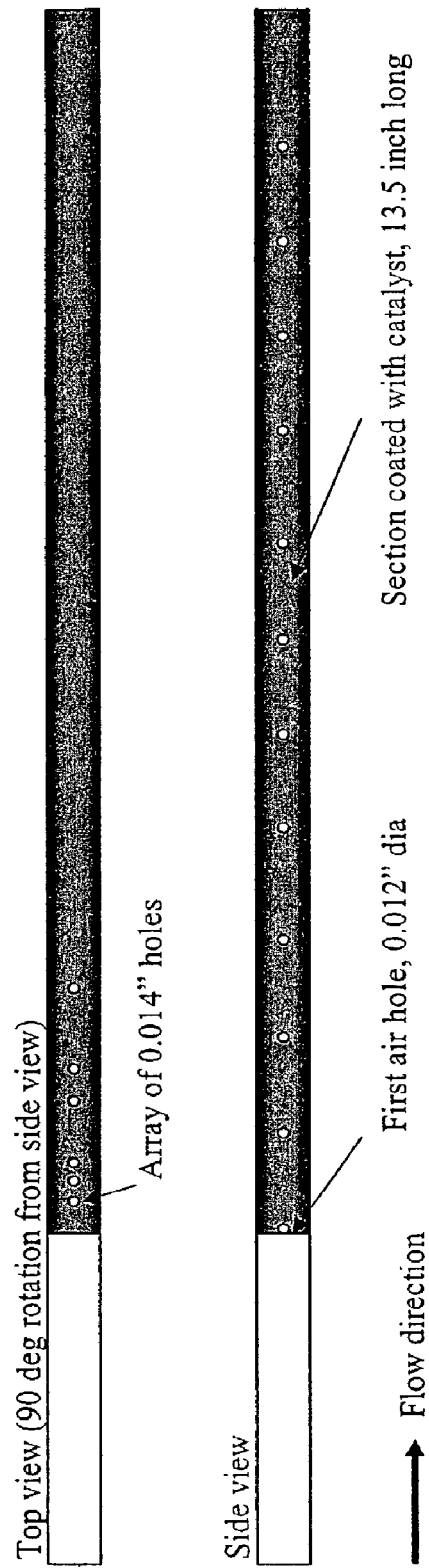
FIG. 4 shows the distribution of holes in the top and side of the combustion tube in the tube-in-tube configuration of the Examples section.
Figure 5:
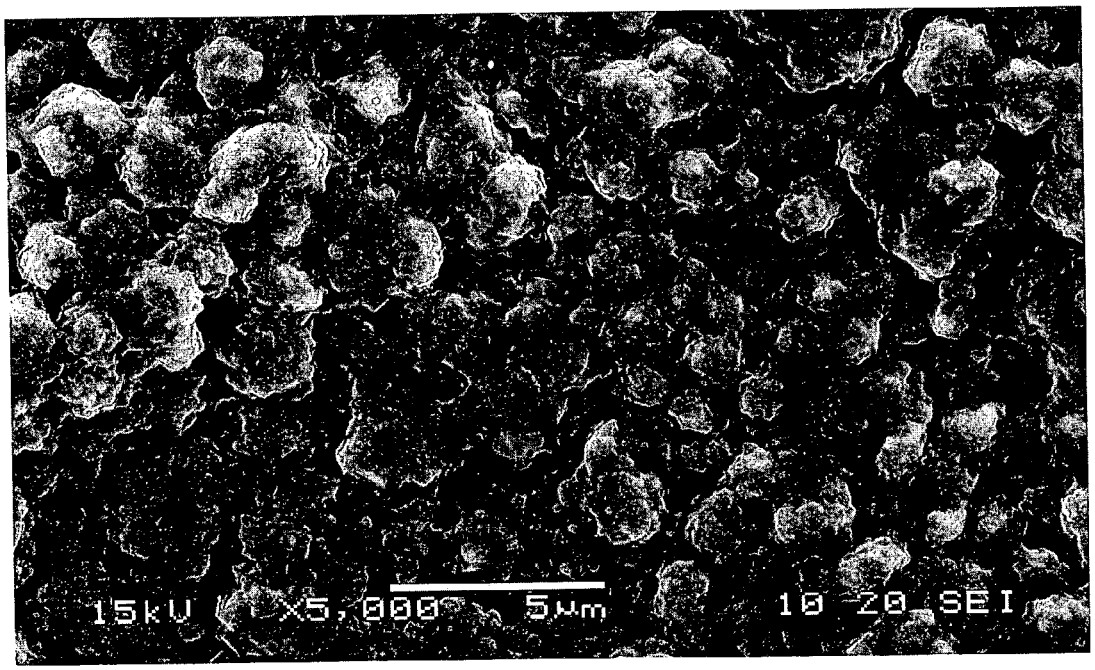
FIG. 5 is a micrograph of the surface of oxidized Inconel® 617. The pictured surface oxide is dense.

The sample of Inconel 617® oxidized with $H_2/H_2O$ heat-up was also measured for porosity and surface area of the oxide layer. Twenty-five thin Inconel 617® strips (2 inch by 0.1 inch, 0.010 inch thick) were weighed, oxidized according to the $H_2/H_2O$ heat-up procedure described above, and weighed again after oxidation. The metal strips had a total weight of 6.5940 g before oxidation. The weight gain after oxidation is 29.9 mg, suggesting a chromium oxide layer of 94.7 mg if only $Cr_2O_3$ is formed. The strips were measured for pore volume and surface area by $N_2$ adsorption at a temperature of 77 K in an ASAP 2010 instrument. Three measurements were made on the same sample and the averages are reported below. The total pore volume is measured to be 0.00009+/−0.00002 cm$^3$/g, but the micro-pore volume is negative 0.00004 cm$^3$/g, or un-measurable. Having no micro-pore volume is a strong contrast to conventional catalyst supports, which are abundant in micro- meso- and macro-pores with total porosity easily reaching 80-90%. Assuming all the pore volume in the oxidized Inconel 617® is in the oxide layer, the porosity of the oxide layer would be only about 3%. FIG. 4 shows the topography of the oxidized Inconel 617®. The surface appears to be rough due to the growth of chromium oxide crystallites. The separations between crystallites are in the range of 0.1 to 2 microns, outside of the size range of micro-pores commonly found in conventional catalyst supports. Total surface area is measured to be 0.05+/−0.01 m$^2$/g. But micro-pore area is measured to be negative 0.04 m$^2$/g, or un-measurable. This suggests that the surface area is too small to be measured accurately.

Catalyst Preparation and Testing #1

Figure 2:
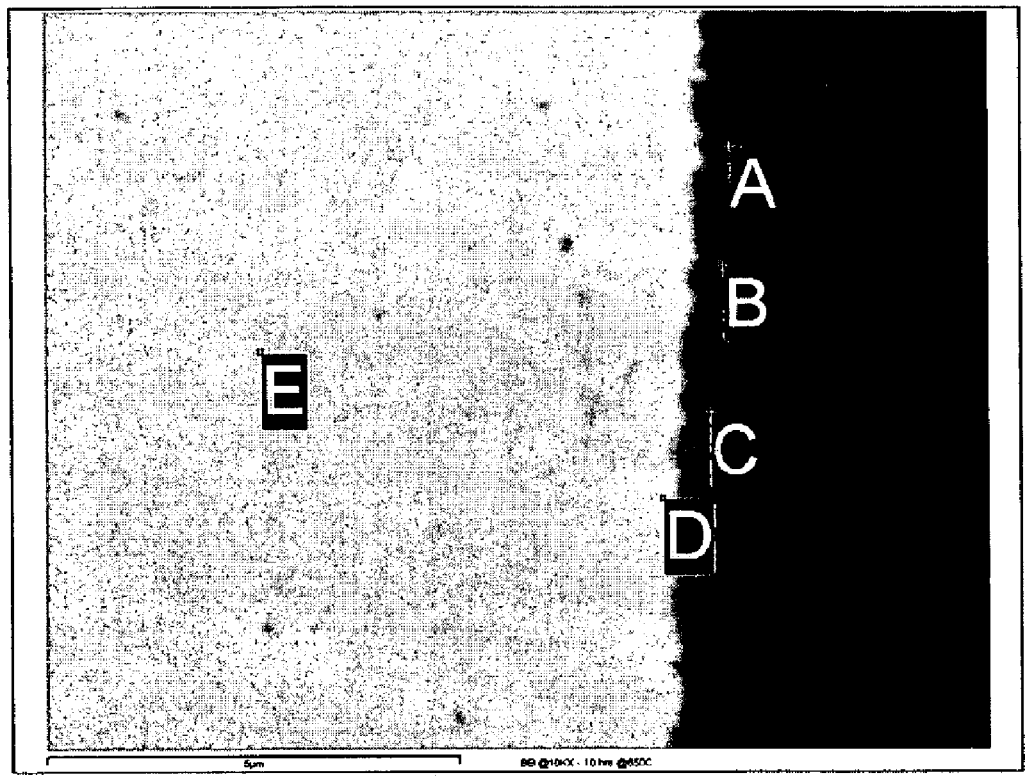
FIG. 2 is a photograph taken by scanning electron microscopy (SEM) of a cross-section of a sample of Inconel 625 after it has been exposed to air for 10 hours at 850° C.

A tube-in-tube testing device was used to evaluate the performance of a combustion catalyst covering both fuel-rich and fuel-lean combustion with distributed air injection. The device was constructed by using two Inconel tubes, the inner tube for combustion and the outer one for air supply. Two arrays of holes were drilled along the inner tube to provide distributed air injection into the inner tube. Catalyst was coated on the inside of the inner tube. The inner tube is made of Inconel 625®, with an ID of 0.082 inch (2.1 mm) and an OD of 0.125 inch (3.2 mm). The outer tube is made of Inconel 625°, with an OD of 0.375 inch (9.5 mm). The two tubes were joined together by using two Inconel® fittings at the two ends of the outer tube. The outer tube has a welded-on side tube for air inlet located at the center, as is illustrated in FIG. 2. The thermocouple locations are indicated as "TC." FIG. 3 shows the allocation of the air holes along the inner (combustion) tube. One side of the tube has 18 equally spaced holes that are 0.30 mm in diameter. Another side of the tube (90 degrees away) has 6 holes, 0.36 mm diameter, with the spacing shown in FIG. 3.

Both tubes were degreased with hexane, washed with 20% nitric acid, rinsed with DI water and isopropanol, and dried. The inner tube was then heat treated in flowing air (150 sccm) to grow a chromium oxide layer. Heat treatment was done by ramping the temperature up at 3.5° C./min to 1,000° C., holding at 1,000° C. for 1 hr, and ramping down to room temperature at 3.5° C./min.

After heat treatment, the inner tube was coated with a Ce—Pd combustion catalyst on the inside with a Ce:Pd molar ratio of 4:1. A syringe pump was used to deliver the desired volume of the catalyst solution to the inner tube, which was held vertical by a ring stand. The coated length (shaded area in FIG. 3) is 13.5 inches (34 cm), covering all air holes and ending at the first air hole. Before coating, the air holes were sealed by wrapping Teflon tape around the outside of the tube. The Teflon tape was removed after each coating for hole clearing and lube drying, and reapplied before the next coating. The device was washcoated a total of three times, each followed by a 100° C. drying with flowing air (hydrocarbon-free grade) at a rate of 150 cc/min. Before drying, compressed nitrogen was used to purge the device to ensure that all air holes were fully open. After coating, the tube was calcined in flowing air from room temperature to 950° C. at 3.5° C./min, held at 950° C. for 1 hr, and cooled at 3.5° C./min to room temperature.

This tube-in-tube device was used for combustion evaluation using methane, hydrogen, and methane-hydrogen mixture as the fuel. The temperature profile along the inner tube was monitored. The furnace set point was adjusted so that the maximum measured temperature was at about 950° C.

When the device was used to combust methane, the total flow was 4.44 SLPM of air through the air line, and 445 SCCM of methane through the fuel line. The furnace was heated to about 770° C., at 10° C. per minute. The full 4.44 SLPM of air and 445 SCCM of nitrogen flowed through the device while it was being heated. Once the furnace was at temperature the $N_2$ was replaced by methane in 89 SCCM increments. The air flow rate was not changed. The furnace temperature was increased to achieve light off, then decreased once light off occurred to ensure that the highest measured temperature was never higher than 950° C. GC samples were taken occasionally to confirm that methane was being combusted. A GC sample was also taken once all of the nitrogen was replaced by methane to measure the amount of total conversion.

When the device was used to combust hydrogen, the air flow rate was still 4.44 SLPM, but the hydrogen flow rate was 1.775 SLPM. The furnace was only heated to 100° C. before the nitrogen was replaced by hydrogen. The hydrogen was added in increments of 355 SCCM. GC samples were taken to confirm conversion after all of the hydrogen was phased in.

A first run (base case, ♦ in FIG. 2) was done testing methane as the fuel. Light off did not occur with just 89 SCCM of methane, but occurred with 178 sccm of methane at 910° C. After the full methane flow was phased in, the furnace temperature was adjusted to achieve a maximum temperature of about 95° C. along the inner tube. Experimental conditions and results are shown in Table B. Average heat flux through the inner tube was calculated to be 14 W/cm$^2$.

In the second run (air premix, ■), most of the air was still fed through the air line, but some was premixed with the methane and fed through the fuel line. The air flow through the air line was 3.60 SLPM throughout the whole run. In the fuel line the total flow was always 1.28 SLPM. While the furnace was heating the full fuel line flow was $N_2$. Once the furnace was at temperature the $N_2$ flow was lowered by 255 SCCM increments each time that methane was increased by 89 SCCM and air was increased by 170 SCCM. After the full 444 SCCM of methane and 840 SCCM of air were going through the fuel line, a GC sample was taken. The furnace temperature was adjusted to achieve a maximum inner tube temperature of about 950° C. With air pre-mix in the fuel line, both methane conversion and $CO_2$ selectivity were improved, and temperature variation along the inner tube was lowered.

For the third run (▲ in FIG. 2), a back-pressure regulator was added to raise the operating pressure. A 25 psi pressure was maintained throughout the run. Raising operating pressure resulted in improved methane conversion and $CO_2$ selectivity. Temperature variation along the inner tube was also reduced.

The fourth run (half flow, x in FIG. 2) was done with all flow rates halved. Total air flow was 2.22 SLPM, and total methane flow was 222 SCCM. This changed the GHSV from 3.4 to $1.7 \times 10^5$ hr$^{-1}$. The furnace was heated to 850° C. before any methane was added. The device lit off when the first 44.5 SCCM of methane was added. With the flow halved, both methane conversion and CO2 selectivity improved, and the temperature variation along the inner tube was reduced (FIG. 2).

The tube-in-tube reactor had an "effective compactness" of about 12 W/cc of apparatus at a gas feed of about 15,000 h$^{-1}$. In preferred embodiments, reactors will have an "effective compactness" of at least 1 W/cc of apparatus at a gas feed of 2,000 more preferably at least 2 W/cc, and in some embodiments 1 to 10 W/cc of apparatus at a gas feed of 2,000 h$^{-1}$. In other preferred embodiments, a reactor will have an "effective compactness" of 15 to 25 W/cc of apparatus at a gas feed of 20,000 $h^{-1}$.

Raising pressure creates more collisions of the molecules with the catalyst, therefore higher methane conversion. As the reaction moves toward more completion in the presence of excess air, $CO_2$ selectivity increases because combustion is thermodynamically downhill and is not equilibrium-limited. Halving flow doubles residence time in the reactor, therefore higher methane conversion. The uncertainty in $CO_2$ selectivity is estimated to be lower than 0.5%.

TABLE B

Summary of tube-in-tube performance

|  | Base case | Air premix | Raised pressure | Half flow |
|---|---|---|---|---|
| Fuel line CH4, slpm | 0.444 | 0.444 | 0.444 | 0.222 |
| Fuel line air, slpm |  | 0.84 |  |  |
| Air line air, slpm | 4.44 | 3.6 | 4.44 | 2.22 |
| Max inner tube T, C | 949 | 943 | 950 | 949 |
| Fuel line pressure drop, psid | 3.0 | 3.8 | 2.3 | 1.4 |
| Air line pressure drop, psid | 4.3 | 4.2 | 3.3 | 2.0 |
| Avg reactor pressure, psig | 10 | 11 | 23 | 6 |
| GHSV, $hr^{-1}$ | $3.4 \times 10^5$ | $3.4 \times 10^5$ | $3.4 \times 10^5$ | $1.7 \times 10^5$ |
| Methane conversion, % | 89.4 | 96.5 | 95.5 | 94.8 |
| CO2 selectivity, % | 95.8 | 98.4 | 100.0 | 100.0 |

Catalyst Preparation and Testing
Preparation of Pd-based Catalysts

Inconel® (617 and 625) tubes and slotted Inconel® bars were used as reactors for some combustion tests. The tubes were usually ⅛ inch (3.2 mm) in outer diameter and 3.0 inches (7.6 cm) in length. The slotted bars were solid metal (except for the open slot) and 0.5 inch (1.3 cm) in outer diameter and 2.0 inches (5.1 cm) in length, with a slot (0.365 inch×0.020 inch×2.0 inch) (9.3 mm×0.51 mm×5.1 cm) in the center. The reactors were first cleaned for 5-30 min using hexane or iso-propanol with sonication. After drying at 80° C. for 1-2 hrs, they were heat treated in air at 900-1000° C. for 1-3 hrs, with heat-up and cool-down rates of 1-20° C./min. A native oxide layer, mainly $Cr_2O_3$, formed on their surfaces. The oxide layer is very dense and functions as a protective layer for the metal alloy underneath. After the preoxidized tubes and slotted bars were cooled to room temperature, a solution was washcoated onto the channel walls. The solution typically consisted of 10-20 wt. % $Pd(NO_3)_2$ or a mixture of 5.7 wt. % $Pd(NO_3)_2$ and one of the nitrates of cerium, praseodymium and terbium, with rare-earth to Pd molar ratios of 2-4. The excess solution was blown off by compressed air. Finally, the tubes and pellets were dried at 80-100° C. for 1 h and then calcined at 900-1000° C. for 1 h. The solution concentration and coating times could be varied to get a desired catalyst loading amount.

Preparation of Pt-based Catalyst

After the Inconel® slotted bars were preoxidized in air, a Pt solution, e.g., 10 wt. % $Pt(NH_3)_4(NO_3)_2$, was washcoated onto the internal walls of the slotted bar. The excess solution was blown off by compressed air. The slotted bar was then dried at 100° C. for 1 h. The coating and drying process was repeated twice. Finally the slotted bar was calcined at 1000° C. for 1 h. The solution concentration and coating times could be varied to get the desired Pt loading amount.

Preparation of Pd—Pt-based Catalysts

After the Inconel® tubes and slotted bars were coated with Pd catalysts, 10 wt. % $Pt(NH_3)_4(NO_3)_2$ was washcoated onto the channel walls. The excess solution was blown off by compressed air. Subsequently, the slotted bars were dried at 80-100° C. for 1 h and then calcined at 900-1000° C. for 1 h. Similarly, the solution concentration and coating times could be varied to get desired Pd and Pt loading amounts.

Combustion Activity Tests

The solution-coated tubes were tested for $CH_4$ combustion at 1 atmosphere under fuel-rich conditions. The feed gas consisted of 9% $CH_4$, 1.9% $O_2$ and 89.1% $N_2$. The total flow rate was around 5 liters/min (at standard conditions). The GHSV (gas hourly space velocity) was approximately 1.6× $10^6$ $h^{-1}$ based on tube volume. During the test, the tubes were heated stepwise in flowing reaction gas to desired temperatures at heating rates of 5-10° C./min. At each temperature of interest, the effluent gas was analyzed by a gas chromatograph (Agilent 3000A), with a 5 Å molecular sieve column for separation of $H_2$, $O_2$, $N_2$, $CH_4$ and CO and a Poraplot Q column for separation of $CO_2$ and $C_{2+}$ hydrocarbons. $CH_4$ conversion and $O_2$ conversion are obtained by the differences in $CH_4$ or $O_2$ flow rates before and after the reaction. $CO_2$ selectivity is defined as $[CO_2]/([CO]+[CO_2]+2\times[C_2H_6]+2\times[C_2H_4])\times100\%$.

The solution-coated slotted bars were tested for combustion of $CH_4$, CO and $H_2$ at 1 atmosphere under fuel-lean conditions. The feed gas consisted of 1.0% $CH_4$, 2.0% CO, 1.2% $H_2$, 4.4% $O_2$ and 91.4% $N_2$. The total flow rate was around 4.4 liters/min (at standard conditions). The GHSV was approximately $1.1\times10^6$ $h^{-1}$ based on channel volume. The other conditions and analytical techniques were similar to the above fuel-rich test.

Combustion Activity

The preoxidized Inconel tube without catalyst was inactive for $CH_4$ combustion under fuel-rich conditions. Both $CH_4$ and $O_2$ conversions were below 3% at 600-900° C. at a GHSV of $1.6\times10^6$ $h^{-1}$. When the tube was coated with PdO, 33-92% $O_2$ conversions were achieved at 630-950° C. under the same conditions, as shown in Table 1. With $CeO_2$ or $PrO_x$ added to the Pd catalysts, the combustion activities increased significantly at 700-950° C., although the total weights of the catalysts were halved when compared to the un-promoted PdO catalyst (Table 1). $TbO_x$ also shows a promoting effect at around 720° C.

The combustion activities on Pd—Pt-coated tubes are summarized in Table 2. It is clear that Pt promotes $CH_4$ combustion. The M-Pd—Pt (M=Ce, Pr or Tb) coated tubes show higher conversions than the M-Pd coated tubes at around 820° C. The effect at temperatures over 900° C. is less pronounced The effect of sonication of preoxidized tube on combustion activity on $CeO_2$—PdO catalyst is shown in Table 3. Surprisingly, we found that catalyst loading is increased by more than 40% when compared to a tube prepared by the same method except without sonication. The tube prepared with sonication showed substantially higher conversions over the reference tube prepared without sonication.

In most tests, $CO_2$ selectivity is below 100%. The other carbon containing products are CO (majority) and $C_2$ hydrocarbons (trace). It is expected that CO can be burned off easily when excess $O_2$ is used under fuel-lean conditions.

The solution-coated slotted bars were tested for combustion of $CH_4$, CO and $H_2$ under fuel-lean conditions. The results are summarized in Table 4. As expected, the combustion activity of the catalysts decreases in an order of $H_2$>CO>$CH_4$. The Pt—Pd—Ce catalyst shows higher activities than Pd—Ce and Pt alone. It was found that $CH_4$ conversion decreases in a sequence of $PrO_x$—PdO—Pt>$CeO_2$—PdO—Pt>$CeO_2$—PdO>Pt. CO and $H_2$ conversions are close to 100% at 500-930° C. on the multi-component catalysts. The $PrO_x$—PdO—Pt coated slotted bar was also tested for durability. $CH_4$ conversion increased from 30% to 45-50% in the initial 40 hrs on-stream and did not change significantly in the next 460 hrs at 930° C. CO and $H_2$ conversions remained at 100%.

The above results demonstrated that catalysts on a native Cr oxide layer is highly active for combustion of $CH_4$, CO and $H_2$. Noble metal catalysts, promoted or un-promoted, are usually made by finely dispersing the precious metal on the surface of porous, high surface area oxide supports such as aluminum oxide. In this invention, however, the native chromium oxide layer can be dense and low in porosity and surface area. Palladium and platinum catalysts prepared using such native oxides as supports have demonstrated excellent performance in catalytic combustion of methane at extremely high space velocities (for example, GHSV=$2 \times 10^6$ $h^{-1}$).

TABLE 1

Catalytic performance of PdO-coated Inconel ® tubes for methane combustion under fuel-rich conditions. Temperature was measured by thermocouples.

| Catalyst | Weight (mg) | Temp. (° C.) | $CH_4$ conv. (%) | $O_2$ conv. (%) | $CO_2$ select. (%) | Carbon balance (%) |
|---|---|---|---|---|---|---|
| PdO | 18.8 | 631 | 2.2 | 33.2 | 99.3 | 1.1 |
| | | 718 | 1.7 | 17.6 | 97.8 | 0.0 |
| | | 842 | 9.3 | 89.5 | 32.0 | 2.5 |
| | | 948 | 10.8 | 92.4 | 17.2 | 1.2 |
| $CeO_2$—PdO (4/1) | 8.0 | 618 | 5.1 | 34.5 | 98.3 | −2.0 |
| | | 703 | 5.0 | 29.8 | 97.4 | −3.0 |
| | | 853 | 14.1 | 92.7 | 29.1 | −4.1 |
| | | 951 | 14.9 | 96.1 | 15.4 | −2.4 |
| $PrO_x$—PdO (4/1) | 9.0 | 610 | 0.3 | 4.9 | 88.5 | 1.8 |
| | | 809 | 3.4 | 50.4 | 80.5 | 1.6 |
| | | 856 | 6.8 | 79.3 | 51.7 | 0.8 |
| | | 945 | 11.0 | 99.2 | 13.3 | 2.3 |
| $TbO_x$—PdO (4/1) | 6.7 | 721 | 1.2 | 49.1 | 58.0 | 7.7 |
| | | 831 | 2.7 | 66.7 | 43.1 | 10.3 |
| | | 936 | 11.6 | 79.2 | 9.9 | 8.8 |

Reaction conditions: [$CH_4$] = 9%, [$O_2$] = 1.9%, $N_2$ = balance, total flow rate = 4.8 SLPM, GHSV = $1.6 \times 10^6$ $h^{-1}$ (based on tube volume).

TABLE 2

Catalytic performance of PdO—Pt-coated Inconel ® tubes for methane combustion under fuel-rich conditions.

| Catalyst | Weight (mg) | Temp. (° C.) | $CH_4$ conv. (%) | $O_2$ conv. (%) | $CO_2$ select. (%) | Carbon balance (%) |
|---|---|---|---|---|---|---|
| $CeO_2$—PdO (2/1) | 4.2 | 825 | 4.9 | 35.5 | 100.0 | −2.1 |
| | | 952 | 12.6 | 74.6 | 100.0 | 2.5 |
| $CeO_2$—PdO (2/1)—Pt | 4.7 | 845 | 14.3 | 82.8 | 39.5 | 0.4 |
| | | 936 | 15.8 | 84.5 | 19.6 | 1.9 |
| $PrO_x$—PdO (2/1) | 2.1 | 835 | 6.0 | 46.7 | 49.6 | 1.2 |
| | | 935 | 24.8 | 86.8 | 18.3 | −9.8 |
| $PrO_x$—PdO (2/1)—Pt | 3.8 | 835 | 9.7 | 66.7 | 58.7 | 1.0 |
| | | 935 | 15.9 | 83.7 | 32.8 | 0.2 |
| $TbO_x$—PdO (2/1) | 3.5 | 779 | 3.4 | 67.7 | 100.0 | 8.5 |
| | | 886 | 10.4 | 84.5 | 50.7 | 5.2 |
| $TbO_x$—PdO (2/1)—Pt | 4.6 | 833 | 15.7 | 88.4 | 64.7 | −3.7 |
| | | 939 | 20.3 | 90.9 | 13.3 | −4.4 |

Reaction conditions: [$CH_4$] = 9%, [$O_2$] = 1.9%, $N_2$ = balance, total flow rate = 4.8 SLPM, GHSV = $1.6 \times 10^6$ $h^{-1}$ (based on tube volume).

TABLE 3

Effect of sonicating heat-treated Inconel ® tube on combustion performance of $CeO_2$—PdO catalyst under fuel-rich conditions.

| Catalyst | Weight (mg) | Temp. (° C.) | $CH_4$ conv. (%) | $O_2$ conv. (%) | $CO_2$ select. (%) | Carbon balance (%) |
|---|---|---|---|---|---|---|
| $CeO_2$—PdO (4/1) Without sonication | 6.6 | 655 | 6.1 | 53.9 | 100.0 | 0.5 |
| | | 727 | 3.3 | 34.2 | 100.0 | 0.6 |
| | | 844 | 8.2 | 65.0 | 100.0 | −1.3 |
| | | 934 | 15.9 | 99.0 | 21.4 | 1.1 |
| $CeO_2$—PdO (4/1) with sonication | 9.3 | 663 | 8.0 | 64.6 | 100.0 | −0.1 |
| | | 760 | 9.6 | 72.9 | 87.8 | 0.0 |
| | | 844 | 12.2 | 90.5 | 75.8 | 0.1 |
| | | 933 | 16.0 | 99.3 | 18.2 | 2.1 |

Reaction conditions: [$CH_4$] = 9%, [$O_2$] = 1.9%, $N_2$ = balance, total flow rate = 4.9 SLPM, GHSV = $1.6 \times 10^6$ $h^{-1}$ (based on tube volume).

TABLE 4

Catalytic performance of solution-coated slotted Inconel ® bars for combustion of $CH_4$, CO and $H_2$ under fuel-lean conditions.

| Catalyst | Weight (mg) | Temp. (° C.) | Conversions (%) | | | | Carbon balance (%) |
|---|---|---|---|---|---|---|---|
| | | | $CH_4$ | CO | $H_2$ | $O_2$ | |
| Pt | 3.6 | 555 | 3.2 | 62.8 | 85.4 | 26.5 | −2.6 |
| | | 719 | 2.0 | 61.8 | 92.2 | 26.3 | −0.7 |
| | | 818 | 4.9 | 51.3 | 86.5 | 24.8 | −2.3 |
| | | 915 | 16.6 | 46.4 | 79.9 | 25.8 | −3.9 |
| $CeO_2$—PdO (4/1) | 10.5 | 542 | 3.9 | 96.5 | 100.0 | 36.2 | −1.1 |
| | | 737 | 1.2 | 97.7 | 100.0 | 36.0 | −0.4 |
| | | 833 | 4.9 | 98.2 | 100.0 | 38.0 | −1.0 |
| | | 926 | 17.2 | 100.0 | 100.0 | 42.7 | −2.5 |
| $CeO_2$—PdO (4/1)—Pt | 12.0 | 501 | 1.9 | 95.7 | 100.0 | 36.2 | −3.0 |
| | | 710 | 11.0 | 100.0 | 100.0 | 41.2 | −4.7 |
| | | 810 | 6.1 | 100.0 | 100.0 | 38.9 | −4.9 |
| | | 908 | 17.4 | 100.0 | 100.0 | 44.0 | −5.4 |
| $PrO_x$—PdO (4/1)—Pt | 14.0 | 564 | 5.9 | 100.0 | 100.0 | 36.0 | −6.2 |
| | | 747 | 7.4 | 100.0 | 100.0 | 36.1 | −7.5 |
| | | 840 | 11.5 | 100.0 | 100.0 | 37.8 | −7.8 |
| | | 929 | 29.3 | 100.0 | 100.0 | 42.7 | 2.9 |

Reaction conditions: [$CH_4$] = 1.0%, [CO] = 2.0%, [$H_2$] = 1.2%, [$O_2$] = 4.4%, $N_2$ = balance, total flow rate = 4.4 SLPM, GHSV = $1.1 \times 10^6$ $h^{-1}$ (based on channel volume).

We claim:

1. A catalyst system, comprising:
   a metal substrate comprising chromium and cobalt;
   a chromium-containing oxide layer in direct contact with the metal substrate;
   wherein the chromium-containing oxide layer has a surface that is not adjacent to the metal substrate and wherein this surface has a Co:Cr ratio that is at least 50% less than the metal substrate;
   an active catalyst material on the chromium-containing oxide layer;
   wherein the combination of the metal substrate, the active catalyst material and the chromium-containing oxide layer define a catalyst, and wherein the catalyst has a low surface area of no more than 0.5 $m^2$/g or no more than 1 $m^2$/$inch^2$ of geometric surface area.

2. The catalyst system of claim 1 further comprising a reaction chamber,
   wherein the reaction chamber has an internal dimension of 1 cm or less;
   wherein the active catalyst material is disposed within the reaction chamber.

3. The catalyst system of claim 2 wherein the active catalyst material is a combustion catalyst on the oxide layer; and further wherein the system has a combustion activity selected from the group consisting of:

when a gas mixture containing 9 volume % $CH_4$, 1.9 vol. % $O_2$, and 89 vol. % $N_2$ is passed through the reaction chamber at a GHSV of $1.6 \times 10^6 \, h^{-1}$ and a temperature in the reaction chamber of 835° C., there is a $CH_4$, conversion of at least 9% and an $O_2$ conversion of at least 50%;

when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 710° C., there is a CO conversion of at least 80%; and when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 910° C., there is a CO conversion of at least 90%.

4. The catalyst system of claim 3 wherein the reaction chamber is defined by a wall or walls that comprise the metal substrate.

5. A catalyst system, comprising:
a reaction chamber and a catalyst, wherein the catalyst comprises:
a metal substrate;
an oxide layer disposed on the metal substrate; and
a combustion catalyst on the oxide layer;
wherein the reaction chamber has an internal dimension of 1 cm or less;
wherein the combustion catalyst is disposed within the reaction chamber; and
wherein the system has a combustion activity selected from the group consisting of:

when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 710° C., there is a CO conversion of at least 80%; and when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 910° C., there is a CO conversion of at least 90%.

6. The catalyst system of claim 5 wherein the reaction chamber is defined by a wall or walls that comprise the metal substrate.

7. The catalyst system of claim 5 wherein the catalyst has a low surface area of no more than 0.5 $m^2/g$ or no more than 1 $m^2/inch^2$.

8. The catalyst system of claim 5 wherein the combustion catalyst comprises Pt or Pd.

9. The catalyst system of claim 5 wherein a bulk flow path passes through the reaction chamber.

10. A catalyst system, comprising:
a reaction chamber comprising an outlet;
a process stream in the reaction chamber;
a gas stream passing through the outlet comprising $CO_2$ wherein the atomic ratio of C in the $CO_2$ to C in all molecules in the gas stream is at least 0.2;
a metal substrate;
a chromium- or aluminum-containing oxide layer in direct contact with the metal substrate; wherein the chromium- or aluminum-containing oxide layer contains at least 50 weight % Cr oxide; and
an active catalyst material on the chromium- or aluminum-containing oxide layer;
wherein the combination of the metal substrate, the active catalyst material and the chromium- or aluminum-containing oxide layer define a catalyst, and wherein the catalyst has a low surface area of no more than 0.5 $m^2/g$ or no more than 1 $m^2/inch^2$ of geometric surface area.

11. The catalyst system of claim 10 wherein the reaction chamber comprises a reaction chamber wall that comprises the metal substrate, and wherein the reaction chamber has an internal dimension of 1 cm or less.

12. The catalyst system of claim 10 wherein the catalyst has a low surface area of no more than 0.03 $m^2/cm^2$ of geometric surface area.

13. The catalyst system of claim 11 wherein the reaction chamber comprises at least one wall that has orifices that allow a distributed flow of air or oxygen.

14. The catalyst system of claim 5 wherein the combustion catalyst comprises Ce, Pr, or Tb.

15. The catalyst system of claim 14 wherein the combustion catalyst comprises Pt and Pd.

16. The catalyst system of claim 15 wherein the system has a combustion activity such that:

when a gas mixture containing 9 volume % $CH_4$, 1.9 vol. % $O_2$, and 89 vol. % $N_2$ is passed through the reaction chamber at a GHSV of $1.6 \times 10^6 \, h^{-1}$ and a temperature in the reaction chamber of 835° C., there is a $CH_4$, conversion of at least 9% and an $O_2$ conversion of at least 50%.

17. The catalyst system of claim 5 wherein the system has a combustion activity such that:

when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 710° C., there is a CO conversion of at least 80%.

18. The catalyst system of claim 17 wherein the system has a combustion activity such that:

when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 710° C., there is a CO conversion of at least 95% and a $CH_4$ conversion of at least 5% and an $O_2$ conversion of at least 30%.

19. The catalyst system of claim 17 wherein the system has a combustion activity such that:

when a gas mixture containing 1.0 volume % $CH_4$, 4.4 vol. % $O_2$, 1.2 vol. % $H_2$, 2.0 vol. % CO, and 91.4 vol. % $N_2$ is passed through the reaction chamber at a GHSV of $1.1 \times 10^6 \, h^{-1}$ and a temperature in the reaction chamber of 710° C., there is a CO conversion of at least 80% and a $CH_4$ conversion of 5% to 11% and an $O_2$ conversion of 30% to 41%.

* * * * *